(12) United States Patent
Crisan (10) Patent No.: US 7,856,965 B2
(45) Date of Patent: Dec. 28, 2010

(54) NATURAL VACUUM LEAK DETECTION DEVICE USING DIAPHRAGM-SEAL MECHANISM

(75) Inventor: Adrian Crisan, Chatham (CA)

(73) Assignee: Continental Automotive Canada, Chatham, Ontario (CA)

( * ) Notice: Subject to any disclaimer, the term of this patent is extended or adjusted under 35 U.S.C. 154(b) by 104 days.

(21) Appl. No.: 12/150,991

(22) Filed: May 2, 2008

(65) Prior Publication Data

US 2009/0133672 A1 May 28, 2009

Related U.S. Application Data

(60) Provisional application No. 60/990,396, filed on Nov. 27, 2007.

(51) Int. Cl.
*F02M 37/20* (2006.01)
*F02M 37/00* (2006.01)
(52) U.S. Cl. ......................... 123/516; 123/518
(58) Field of Classification Search .......... 123/518, 123/519, 520, 516, 198 D; 137/493
See application file for complete search history.

(56) References Cited

U.S. PATENT DOCUMENTS

| 5,464,064 | A | 11/1995 | Weingarten | |
|---|---|---|---|---|
| 6,450,153 | B1 | 9/2002 | Perry | |
| 6,840,232 | B2 | 1/2005 | Perry | |
| 6,986,357 | B2 * | 1/2006 | Veinotte et al. | 137/12 |
| 7,011,077 | B2 * | 3/2006 | Veinotte | 123/520 |
| 7,121,267 | B2 | 10/2006 | Perry | |
| 2003/0029506 | A1 * | 2/2003 | Perry | 137/587 |
| 2004/0237944 | A1 * | 12/2004 | Veinotte et al. | 123/520 |
| 2005/0005917 | A1 * | 1/2005 | Veinotte | 123/520 |

OTHER PUBLICATIONS

International Search Report and Written Opinion mailed on Oct. 14, 2008.

\* cited by examiner

*Primary Examiner*—Mahmoud Gimie (57) ABSTRACT

A system and method are provided for detecting a leak in an automotive fuel system. The functions of vacuum sensing, vacuum relief (high vacuum relief level) and pressure relief (high pressure relief level) are all performed by a single self-actuated diaphragm-seal valve mechanism.

18 Claims, 11 Drawing Sheets

NATURAL VACUUM LEAK DETECTION DEVICE USING DIAPHRAGM-SEAL MECHANISM

CROSS REFERENCE TO RELATED APPLICATIONS

This application claims the benefit of U.S. Provisional Patent Application Ser. No. 60/990,396 entitled "Natural Vacuum Leak Detection Device Using Diaphragm-Seal Mechanism" filed on Nov. 27, 2007, the contents of which are hereby incorporated by reference herein in their entirety.

FIELD OF THE INVENTION

The present invention relates generally to the field on-board vehicle leak detection, and more particularly, to systems and methods for detecting a leak in an automotive fuel system using natural vacuum leak detection.

BACKGROUND OF THE INVENTION

Conventional fuel systems for vehicles with internal combustion engines can include a fuel vapor canister that accumulates fuel vapor from a headspace of a fuel tank. If there is a leak in the fuel tank, the canister, or in any associated pipes, conduits, hoses and connections within the system, fuel vapor could escape through the leak and be released into the atmosphere instead of being accumulated in the canister. Various government regulatory agencies, including the U.S. Environmental Protection Agency (USEPA) and the California Air Resources Board (CARB, a part of the California Environmental Protection Agency (Cal/EPA)), have promulgated standards related to limiting fuel vapor releases into the atmosphere. There is therefore a need to avoid releasing fuel vapors into the atmosphere, and to provide an apparatus and a method for performing a leak diagnostic, so as to comply with those standards.

Atmospheric pressure is generally defined as the downward pressure exerted by the weight of the overlying atmosphere. It is generally referred to as one atmosphere of pressure at sea level, with some variation due to altitude and weather conditions. Pressure can be described in absolute terms (e.g. 14.7 lbs/square inch) or in differential (or relative) terms (e.g. lower than atmospheric pressure inside a fluorescent lamp or higher than atmospheric pressure inside a SCUBA tank). In the present application, the pressure differential between the sealed environment within an automotive fuel vapor containment system and a reference pressure such as the ambient atmospheric pressure is of interest. Excessive pressure differentials signifying excessively low pressure or excessively high pressure within an automotive fuel vapor containment system could cause the integrity of the fuel system to be compromised. In this regard, the ability to prevent excess pressure differential is desirable for safety, system performance and longevity.

One method in use for detecting fuel system leaks is known as natural vacuum leak detection (NVLD). The method was presented at the SAE-Toptech Conference, Indianapolis, 1999. In that method, the fuel system, including the fuel tank, fuel vapor canister, and associated pipes, conduits, hoses and connections within the system, are sealed from the atmosphere immediately after an engine shut-down for a predetermined time. During most situations in which a sealed automotive fuel system is not operating, a vacuum develops (pressure below atmospheric pressure) inside the fuel system due to gas law effects, principally from cooling of the tank. A vacuum switch changes state at a specified vacuum level, and that change in state is detected by a processor. If a sufficient vacuum (a sufficiently low pressure) is reached in the system to trip or maintain the switch in the vacuum state over a specified period of time, then the system is deemed to pass the leak test. If sufficient vacuum to change the state of the vacuum switch is not reached or if the vacuum "decreases" too rapidly (i.e. approaches atmospheric pressure too rapidly), the system does not pass the leak test.

Figure 1:
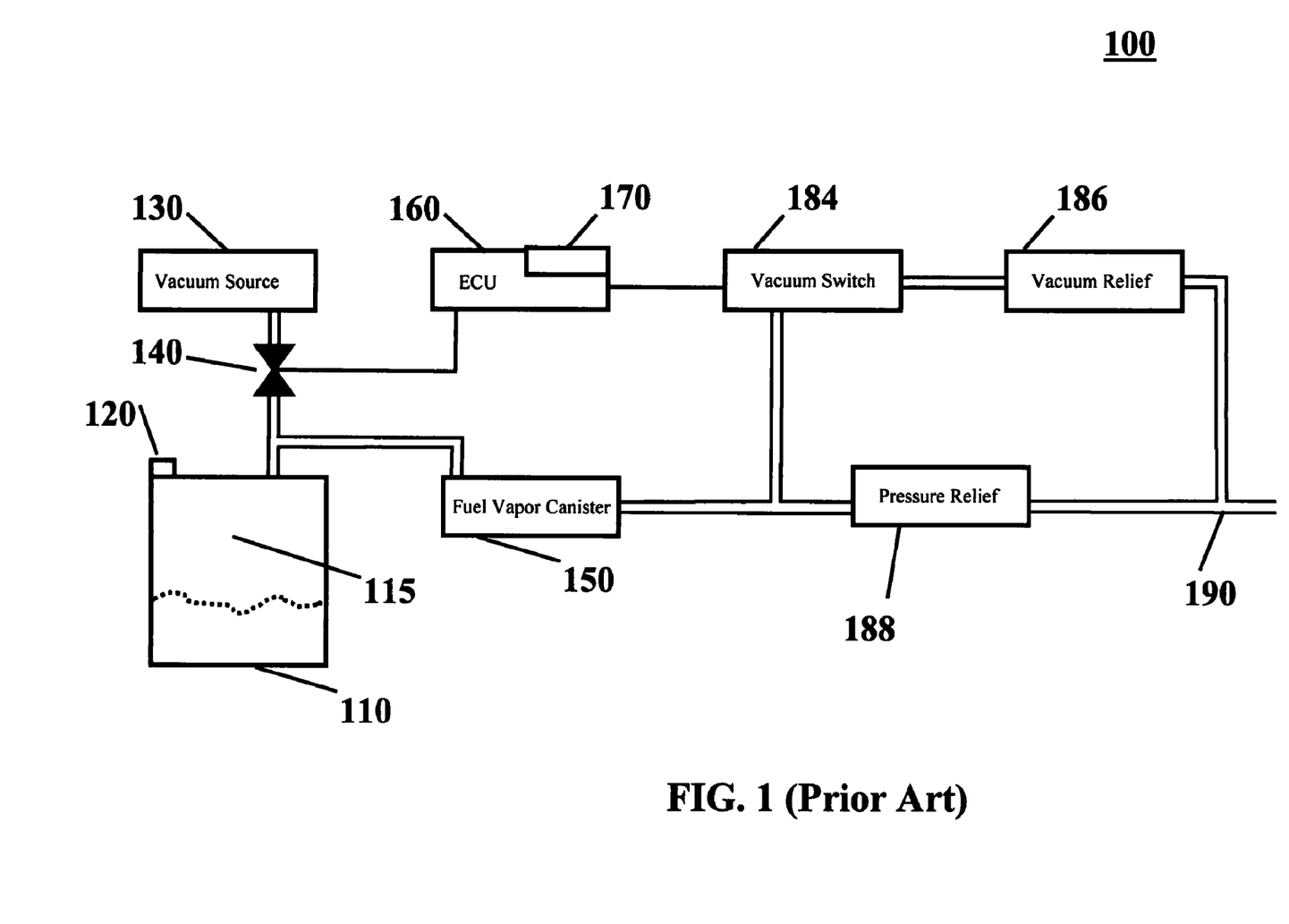
FIG. 1 is a schematic illustration of a prior art fuel system.

FIG. 1 is a schematic illustration of a prior art fuel system capable of NVLD. Referring to FIG. 1, a fuel system 100 for an engine (not shown), includes a fuel tank 110, a vacuum source 130 such as an intake manifold of the engine, a purge valve 140, a fuel vapor canister 150, and an electronic control unit (ECU) or processor 160 with memory storage 170.

Additionally, the fuel system 100 may comprise several components for managing fuel vapor pressure. A vacuum switch 184 signals the ECU 160 that a first predetermined pressure (vacuum) level exists. The vacuum switch 184 may be activated by movement of a diaphragm in response to a pressure differential across the diaphragm.

The fuel system 100 may further comprise a "vacuum relief" device 186 for relieving excessive negative pressure at a value below the first predetermined pressure level, and a "pressure relief" device 188 for relieving excessive positive pressure above a second predetermined pressure level. Both the vacuum relief and pressure relief devices use port 190 which is vented to the atmosphere (i.e. atmospheric pressure) for either drawing air into or venting vapor from the system.

Other functions are also possible. For example, in connection with the operation of the purge valve 140 and a logic process performed by the ECU 160, the system 100 can perform large leak detection during operation. Such large leak detection is used to evaluate situations such as when a refueling cap 120 is either not replaced on the fuel tank, installed incorrectly or otherwise not properly sealing as it was designed to do.

Volatile liquid fuels, including gasoline, can evaporate under certain conditions, such as rising ambient temperature, thereby generating fuel vapor. In the course of cooling that is typically experienced by the fuel system 100 after the engine is turned off, a vacuum is naturally created by cooling of the fuel vapor and air, such as in the fuel tank headspace 115 of the fuel tank 110 and in the canister 150. In accordance with the NVLD test described above, the existence of an acceptable level of vacuum at the first predetermined pressure level at the vacuum switch 184 thru the duration of the test indicates that the integrity of the fuel system 100 is satisfactory, so that system passes the test. Conversely, if the vacuum switch 184 signals the ECU 160 indicating the predetermined level of vacuum is not reached or decreases too rapidly (i.e. approaches atmospheric pressure too rapidly), that indicates the integrity of the fuel system 100 is unsatisfactory, and that the system does not pass the test. As noted below in the discussion regarding type I and type II errors, failing or passing the test does not necessarily mean the fuel system 100 does or does not have an actual leak.

If pressure in the fuel system 100 falls below the first predetermined pressure level, indicating that excessive vacuum is present, the vacuum relief device 186 protects the fuel system 100 from damage by allowing outside air to enter the system through port 190.

Additionally, if pressure in the fuel system 100 rises above a second predetermined level, indicating a pressure well above what the system would normally see, the pressure relief device 188 allows air within the fuel system 100 to be released through port 190 while fuel vapor is retained. Over-pressure of the system is not desired as it could also compromise the integrity of the fuel system 100 by causing possible structural, component or interconnection failure. In the course of refueling the fuel tank 110 through filler cap 120, the pressure relief device 188 may allow air to exit the fuel tank headspace 115 at a high rate of flow. In addition, during a high rate purge of the fuel tank 120, the purge valve 140 may assist in dissipating the high pressure (through a port not shown). That function is commonly referred to as Onboard Refueling Vapor Recovery (ORVR).

As an electromechanical device, the vacuum switch 184 has an activation threshold and a tolerance (error) around the activation required to make a state change. That tolerance must be taken into consideration in order to avoid excessive type I (alpha or false positive) and type II (beta or false negative) errors. An example of a type I error in this context is a leak test result indicating the system has a leak when in reality it does not. An example of a type II error in this context is a leak test result indicating the system has no leak when in reality it does. Systems, particularly sensors and processors, must be statistically capable of discriminating signals from noise and yield acceptable levels of system errors. For this example, a type I error would be an annoyance for a consumer or could cause a fleet owner to lose revenue while a vehicle is out of service un-necessarily. A type II error could cause a vehicle to be unnecessarily venting fuel or fuel vapors to the atmosphere.

On board diagnostics II (OBD II) for detection of evaporative system (EVAP) leaks have been required since the automotive model year 1996 by both the USEPA and Cal/EPA. The OBD II system subjects the fuel tank, vapor lines and fuel vapor canister, and all other components of the fuel system to either vacuum or pressure (manufacturer choice). If the system detects no airflow when the EVAP canister purge valve is opened, or it detects a leakage rate that is greater than that which would pass through a hole 0.040" (1 mm) in diameter (0.020" or 0.5 mm for 2000 and up model year vehicles), it indicates a fault code to the computer.

The vacuum relief device 186 and pressure relief device 188 of many current fuel systems are solenoid actuated valves. A solenoid valve is an electro-mechanical valve actuated by changing an electrical current through a solenoid, thus changing the state of the valve (i.e. from open to closed or from closed to open), depending on the valve design and the "normal" position. A valve normal position is defined as the state in which it will rest when current is removed. Solenoid valves may be normally open or normally closed. To control flow through a solenoid valve, a method called pulse width modulation (PWM) is used. PWM involves modulating the duty cycle and the modulation rate. Because solenoid valves are electro-mechanical devices and have high duty cycles and modulation rates, they have frequent reliability issues and consume processing bandwidth of an ECU.

It would therefore be desirable to improve the reliability of the leak detection, pressure relief and vacuum relief systems of the fuel system described above. It would furthermore be desirable to provide a simple system for performing leak detection and pressure relief having a high level of performance and accuracy, in a cost-effective, compact configuration.

SUMMARY OF THE INVENTION

In accordance with a first aspect of the present invention, there is disclosed a fuel vapor management system, comprising a housing, a divider, a vacuum sensing switch and a pressure relief contact surface of the housing. The housing includes a first chamber communicating with a fuel evaporative system and a second chamber communicating with a vent. The divider separates the two chambers, the divider including: a flexible diaphragm extending from the housing, the diaphragm being alternatively displaceable toward the first chamber and toward the second chamber by pressure differentials between the chambers; and a poppet assembly mounted to the flexible diaphragm for displacement therewith, the poppet assembly defining a normally closed passageway communicating between the first and second chambers through the diaphragm, the passageway being openable by a predetermined vacuum relief pressure differential acting on the poppet assembly whereby a pressure of the second chamber exceeds a pressure of the first chamber. The vacuum sensing switch is mounted to the housing and positioned for actuation by the divider upon displacement of the flexible diaphragm toward the first chamber, the vacuum sensing switch being actuable by a predetermined vacuum sensing pressure differential acting on the divider whereby a pressure of the second chamber exceeds a pressure of the first chamber, the predetermined vacuum sensing pressure differential being less than the predetermined vacuum relief pressure differential. The pressure relief contact surface of the housing is positioned for contacting the poppet assembly upon displacement of the flexible diaphragm toward the second chamber, the passageway further being openable by a force of the contact surface on the poppet assembly resulting from a predetermined pressure relief pressure differential acting on the divider whereby a pressure of the first chamber exceeds a pressure of the second chamber.

The vacuum sensing switch may be actuated by contact with the poppet assembly.

The poppet assembly may further comprise a sealing surface; a poppet mounted for movement between a closed position wherein the poppet is in contact with the sealing surface and closing the passageway, and an open position wherein the poppet is displaced from the sealing surface, permitting flow through the passageway; and a resilient member biasing the poppet toward the sealing surface.

The poppet assembly may further comprise a resilient member locator including: at least one diaphragm mounting structure for mounting the poppet assembly to the diaphragm; a poppet guide in sliding contact with the poppet for guiding the poppet between the closed and open positions; and a resilient member locating surface in contact with the resilient member, the resilient member being contained between the resilient member locating surface and the poppet.

The poppet guide of the resilient member locator may further comprise a post extending from the resilient member locating surface toward the second chamber; and the poppet may further comprise a guide cylinder having an inner cylindrical wall in sliding contact with the post for guiding the poppet.

The poppet may further comprise an end surface of the guide cylinder, the end surface contacting the pressure relief contact surface of the housing upon displacement of the flexible diaphragm toward the second chamber.

The vacuum sensing switch may be actuated by contact with the resilient member locator.

The sealing surface and the flexible diaphragm may comprise a single integral unit.

In accordance with a second aspect of the present invention, there is disclosed method for controlling pressure in a fuel vapor containment system of an engine fuel system. The method generally comprises the steps of: checking for a vacuum leak in the fuel vapor containment system when the engine is off by monitoring a displacement of a diaphragm having one side subjected to a vacuum pressure of the fuel vapor containment system; preventing excess vacuum in the fuel vapor containment system by flowing air into the fuel vapor containment system through a passageway in the diaphragm when a vacuum level in the fuel vapor containment system exceeds a predetermined relief vacuum level; and preventing excess positive pressure in the fuel vapor containment system by flowing a gas mixture from the fuel vapor containment system through the passageway in the diaphragm when positive pressure in the fuel vapor containment system exceeds a predetermined positive pressure relief level.

The step of checking for a vacuum leak in the fuel vapor containment system when the engine is off may further comprise monitoring a switch that is actuated by subjecting the first side of the diaphragm to a predetermined leak diagnostic vacuum level that is lower than the predetermined relief vacuum level.

The step of preventing excess vacuum in the fuel vapor containment system may further comprise subjecting a poppet to the predetermined relief vacuum level, whereby a force exerted on the poppet by the vacuum overcomes a resilient member force maintaining the poppet in a position closing the passageway.

The step of preventing excess positive pressure in the fuel vapor containment system by flowing fuel vapor from the fuel vapor containment system through the passageway in the diaphragm may further comprise displacing the diaphragm in response to excess positive pressure in the fuel vapor containment system, the displacement causing the poppet to contact a pressure relief contact surface to open the passageway, whereby a force exerted on the poppet by the pressure relief contact surface overcomes a resilient member force maintaining the poppet in a closed position.

In accordance with a third aspect of the present invention, there is disclosed a system for controlling pressure in a fuel vapor containment system of an engine fuel system. The system comprises: a displaceable diaphragm having one side subjected to a pressure of the fuel vapor containment system; a sensor for monitoring displacement of the diaphragm; a pressure relief valve mounted on the displaceable diaphragm and configured for allowing flow through the diaphragm into the fuel vapor containment system when a vacuum level in the fuel vapor containment system exceeds a predetermined relief vacuum level, and further configured for allowing flow through the diaphragm out of the fuel vapor containment system when a positive pressure level in the fuel vapor containment system exceeds a predetermined positive pressure relief level.

The pressure relief valve may further comprise: a sealing surface; a poppet mounted for movement between a closed position wherein the poppet is in contact with the sealing surface and closing a passageway through the diaphragm, and an open position wherein the poppet is displaced from the sealing surface, permitting flow through the passageway; and a resilient member biasing the poppet toward the sealing surface.

A surface of the poppet may be subject to the vacuum in the fuel vapor containment system, resulting in a force on the poppet that overcomes the resilient member and displaces the poppet from the sealing surface.

The system may further comprise a pressure relief contact surface facing a surface of the poppet, wherein excess positive pressure in the fuel vapor containment system causes a displacement of the diaphragm and a contacting of the pressure relief contact surface and the surface of the poppet, resulting in a force on the poppet that overcomes the resilient member and displaces the poppet from the sealing surface.

The pressure relief valve may further comprise a resilient member locator including: at least one diaphragm mounting structure for mounting the pressure relief valve to the diaphragm; a poppet guide in sliding contact with the poppet for guiding the poppet between the closed and open positions; and a resilient member locating surface in contact with the resilient member, the resilient member being contained between the resilient member locating surface and the poppet.

The poppet guide of the resilient member locator may further comprise a post extending from the resilient member locating surface; and the poppet may further comprises a guide cylinder having an inner cylindrical wall in sliding contact with the post for guiding the poppet.

The sealing surface and the flexible diaphragm may comprise a single integral unit.

The sensor may be a switch actuated by contact with an element mounted for movement with the displaceable diaphragm.

The switch may be actuated by a displacement of the diaphragm resulting from a vacuum level in the fuel vapor containment system less than the predetermined relief vacuum level.

These aspects of the invention and further advantages thereof will become apparent to those skilled in the art as the present invention is described with particular reference to the accompanying drawings.

DESCRIPTION OF THE INVENTION

The inventors have developed a diaphragm-seal valve mechanism that performs several of the functions described above, including leak detection, vacuum relief and positive pressure relief. The mechanism may be used as part of a natural vacuum leak detection system, incorporated into an automotive ODB II vehicle EVAP diagnostic system.

The functions of vacuum sensing, vacuum relief and pressure relief are typically performed by a plurality of devices in fuel vapor pressure management systems as illustrated in FIG. 1, and described in the background. The present invention simplifies the vacuum sensing, vacuum relief and pressure relief functions to a single component, in a non-electric, self-actuated diaphragm-poppet valve configuration, herein referred to as a diaphragm-seal valve mechanism.

Figure 2:
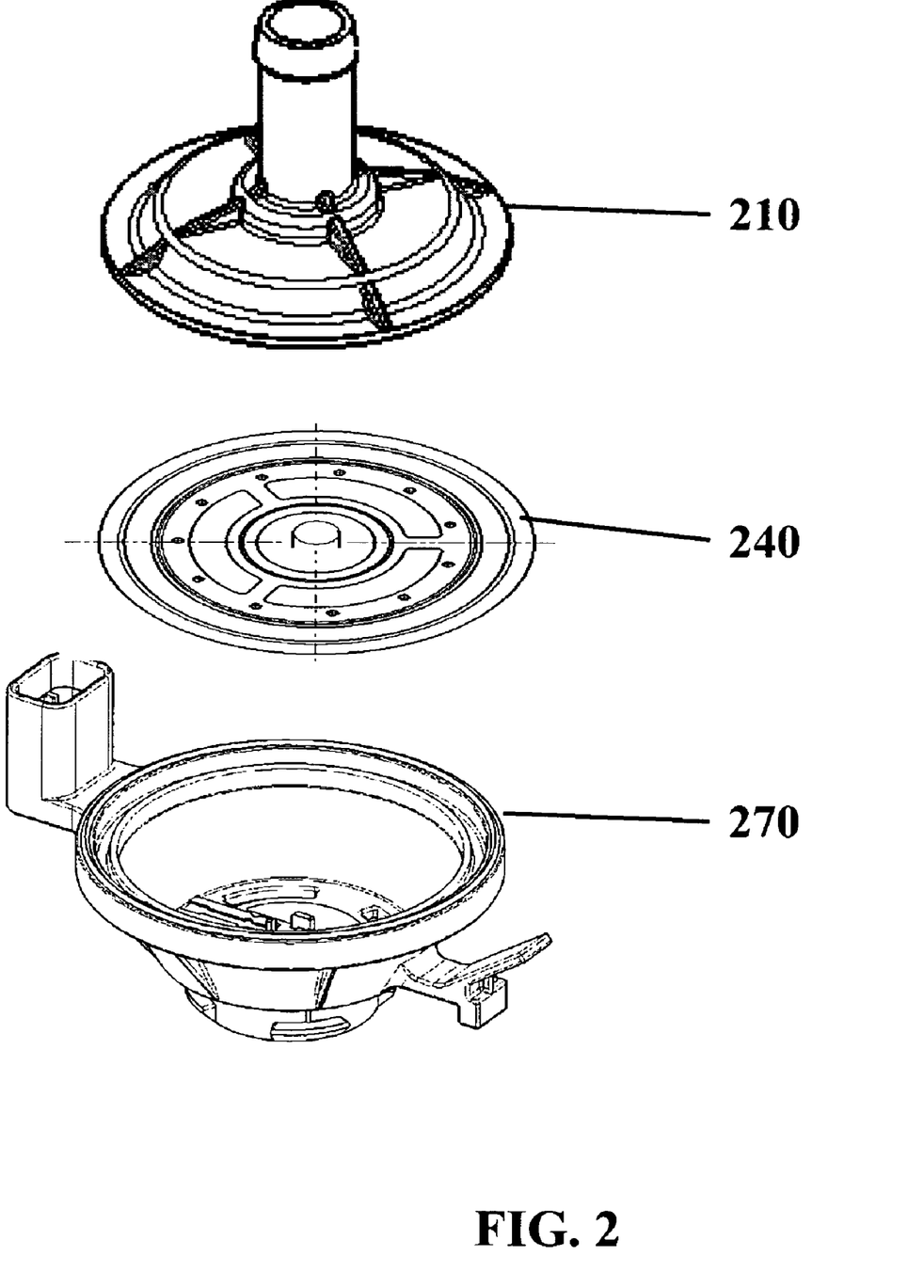
FIG. 2 is a schematic illustration of three components of the diaphragm-seal valve mechanism, in accordance with the current invention.
Figure 3:
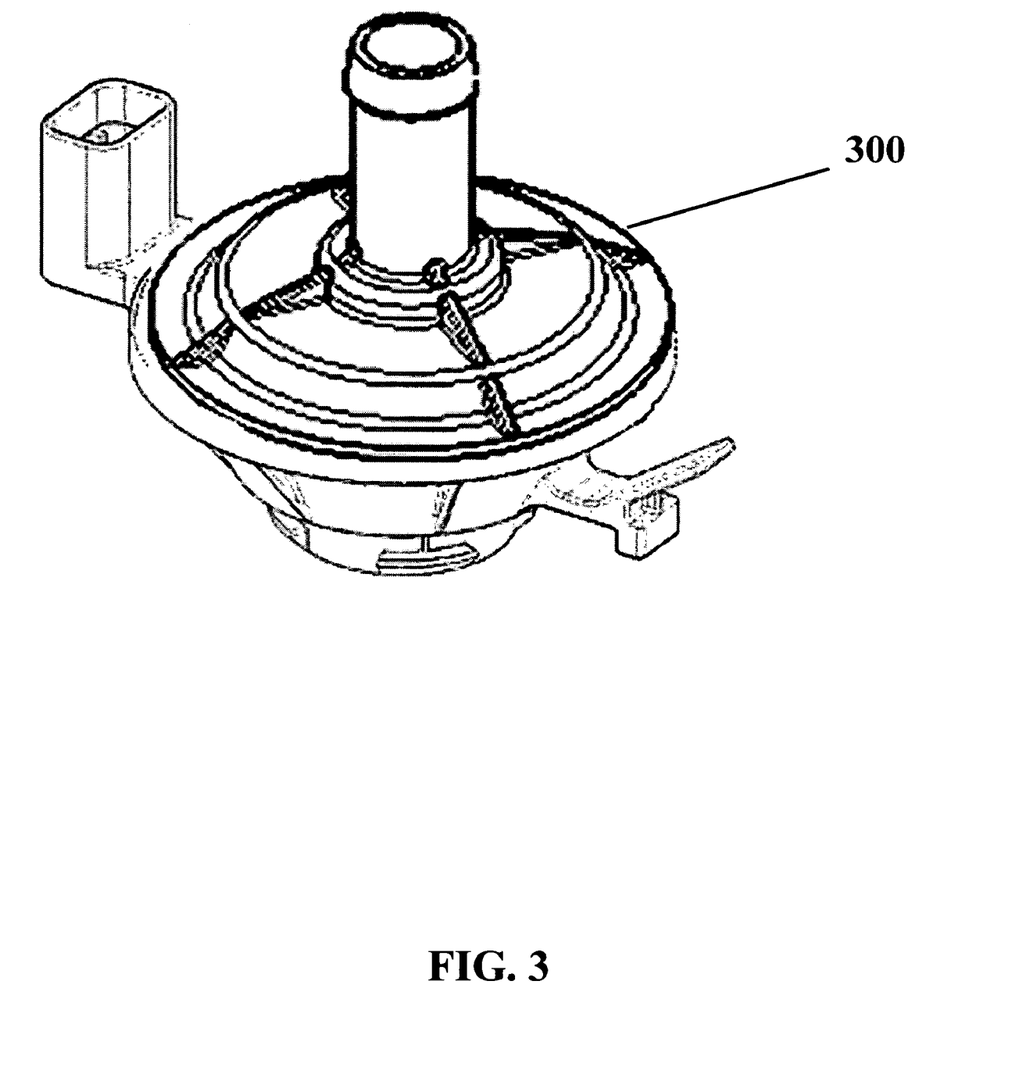
FIG. 3 is a schematic illustration of the assembled diaphragm-seal valve mechanism, in accordance with the current invention.

FIG. 2 is an exploded view including three major components of the diaphragm-seal valve mechanism of the current invention: the cover 210, the diaphragm-seal assembly 240 and the body and terminal assembly 270. FIG. 3 is a schematic illustration 300 of the assembled diaphragm-seal valve mechanism of the present invention, comprising the three components described in reference to FIG. 2.

Figure 4:
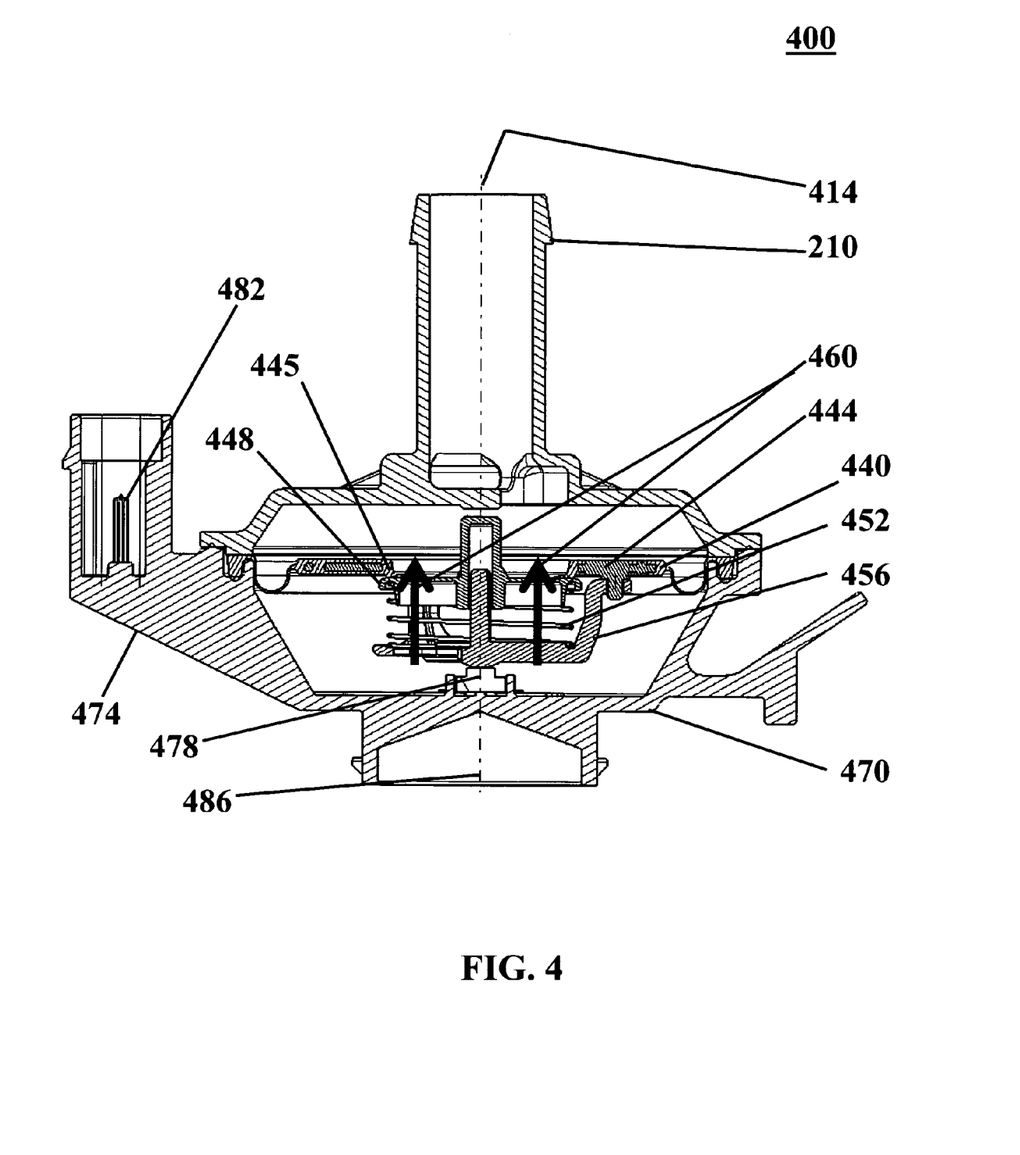
FIG. 4 is a schematic illustration of a diaphragm-seal valve mechanism in the rest position, in accordance with the present invention.

The valve mechanism will now be described with reference to four key functional positions corresponding to FIGS. 4, 5, 6 & 8. FIG. 4 is a schematic illustration of a diaphragm-seal valve mechanism 400 in a rest position, in accordance with the present invention. The cover 210 includes a port 414 communicating with an air filter (not shown) for venting vapor to and drawing air from the atmosphere. The port 414 is preferably maintained at close to atmospheric pressure, although it may be at another reference pressure and remain within the scope of the invention. The port 414 may communicate through a fuel vapor recovery device such as a fuel vapor canister.

A diaphragm-seal assembly 440 comprises a diaphragm 444, and a poppet assembly comprising a poppet 448, a resilient member 452 and a resilient member locator 456. A body and terminal assembly 470 comprises the body and terminal 474, a switch 478, an electrical connector 482 to the OBD II diagnostic system and port 486 communicating with the EVAP system.

FIG. 4 shows a transitory condition between pressure relief and vacuum relief in which no pressure, vacuum or pressure differential is present within the EVAP system. The diaphragm 444 includes a diaphragm sealing element 445 that contacts the poppet 448. The diaphragm seal 445 is fully engaged with the poppet 448 in order to obtain zero leakage in the EVAP system. The poppet 448 is pushed against the diaphragm seal 445 with a force $F_{resilient\ member}$ 460 provided by the resilient member 452.

Figure 5:
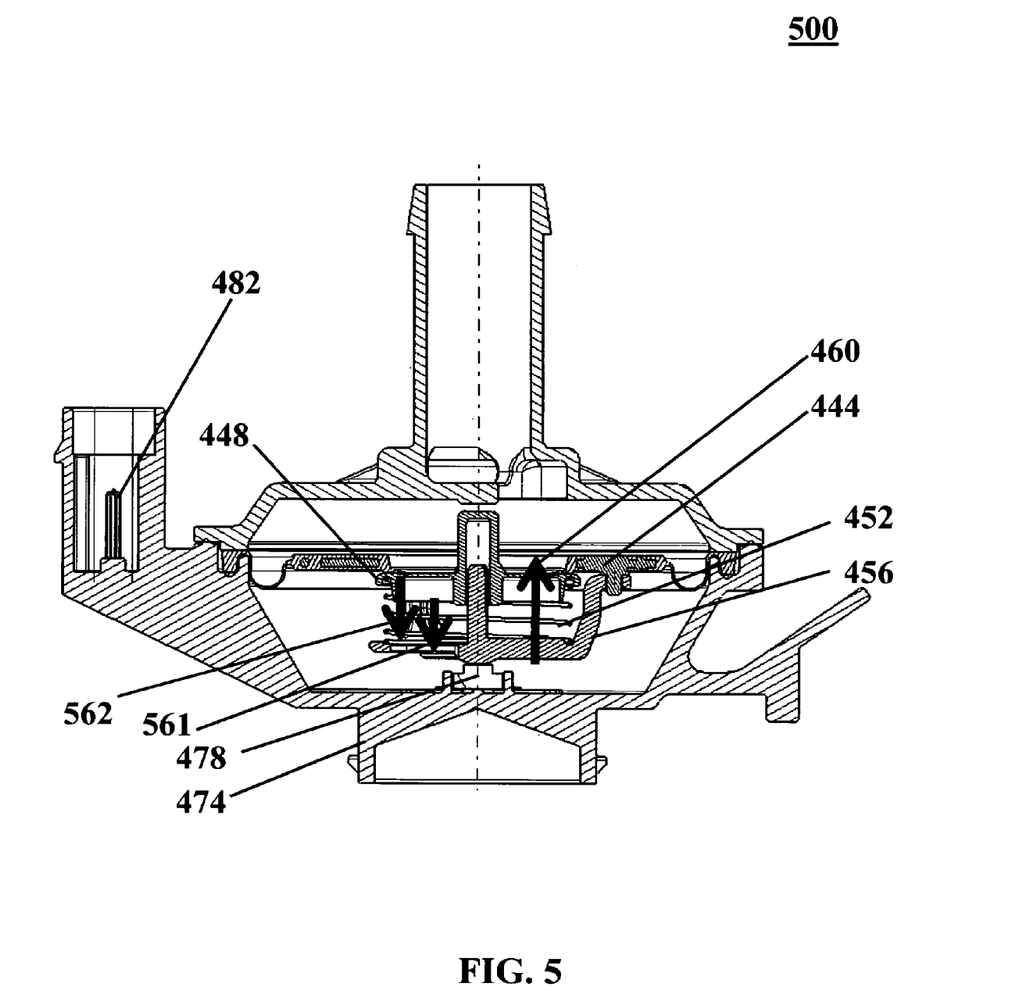
FIG. 5 is a schematic illustration of a diaphragm-seal valve mechanism in the vacuum sensing function position, in accordance with the present invention.

FIG. 5 is a schematic illustration of a diaphragm-seal valve mechanism 500 in the vacuum sensing function position, in accordance with the present invention. That function is used as part of the natural vacuum leak detection system. While in the vacuum sensing position, the diaphragm-seal mechanism 500 acts as a pressure/vacuum sensor or switch to allow the ECU (not shown here) to monitor the vacuum that is caused by natural system cooling after the engine has been turned off, and thereby perform OBD II diagnostics and leak detection. The diaphragm-seal mechanism 500 can detect a vacuum level $Vacuum_{detection\_point}$ by closing switch 478. The switch 478 is electrically connected to the OBD II system through the body and terminal 474 to the electrical connector 482. In response to a pressure differential across the diaphragm, the diaphragm 444 deflects. The resilient member locator 456 pushes on the switch 478 with a force $F_{switch\_to\_close}$ 561. The vacuum detection point is determined by the area of the diaphragm 444 and the activation force of the switch 478. The resilient member 452, resilient member locator 456 and poppet 448 travel together with the diaphragm 444. The force 561 is produced by the diaphragm 444 area under vacuum according to the relationship:

$$F_{switch\_to\_close}(561) = Area_{diaphragm} \times Vacuum_{detection\_point}$$

Due to the way the components are designed, specified, procured, manufactured, quality assured and assembled, the diaphragm-seal mechanism 500 does not need calibration to set the point at which the switch 478 is activated. Previous EVAP valves utilized adjustment mechanisms (i.e. screws, resilient members, displacement devices, . . . ) to calibrate the point at which a switch was activated.

The diaphragm-seal mechanism 500 continues to detect vacuum and keep the EVAP system sealed because the following condition is met:

$$F_{resilient\ member}(460) \geq F_{poppet@vacuum\_detection\_level}(562)$$

Figure 6:
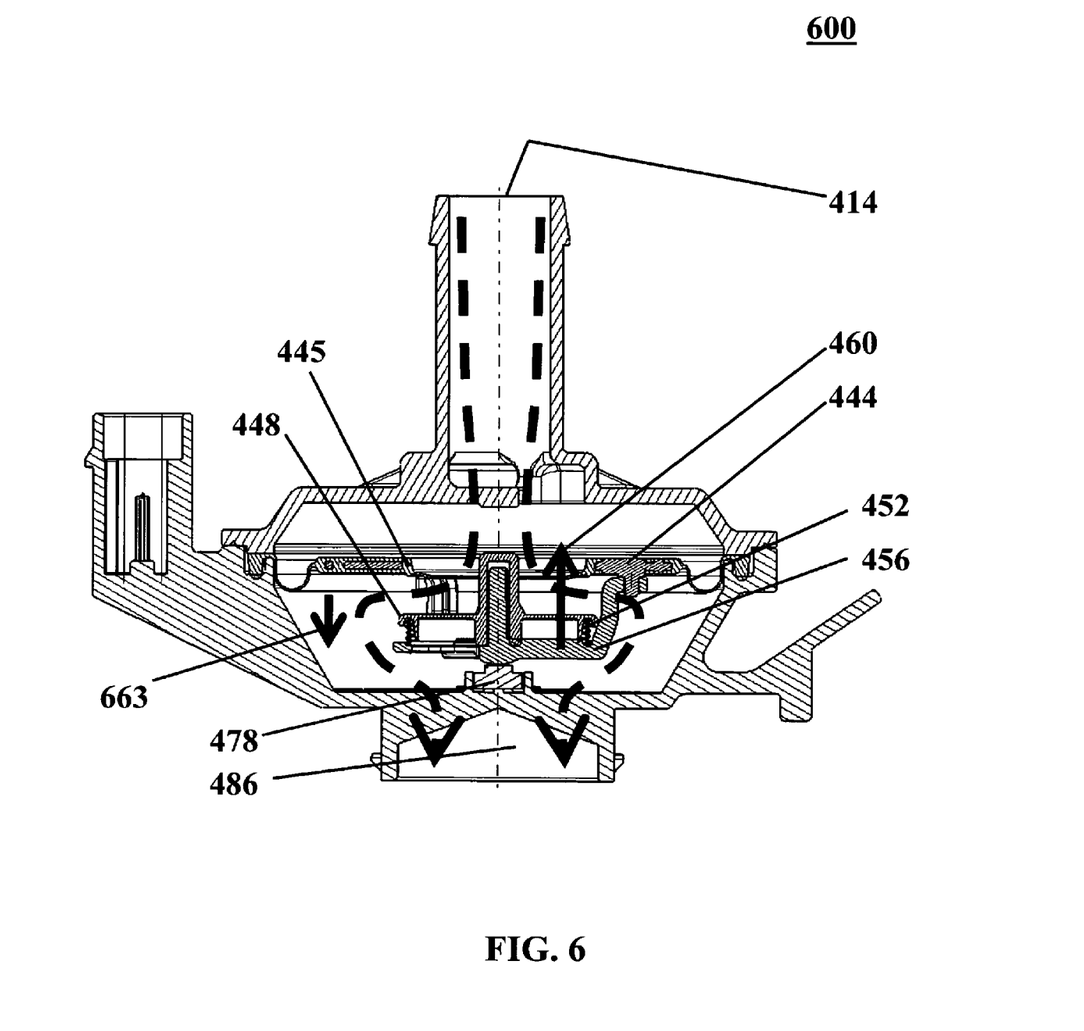
FIG. 6 is a schematic illustration of a diaphragm-seal valve mechanism in the vacuum relief function position, in accordance with the present invention.

Where: $F_{poppet@vacuum\_detection\_level}(562) = Area_{poppet} \times Vacuum_{detection\_point}$ FIG. 6 is a schematic illustration of a diaphragm-seal valve mechanism 600 in the vacuum relief function position, in accordance with the present invention. That function provides vacuum relief (i.e. relieves an excessively high vacuum condition) within the fuel tank and EVAP system with the engine on or off. Without that function, the integrity of the fuel tank and the EVAP system could be compromised when an excessively high vacuum condition occurs.

When the pressure differential across the diaphragm 444 exceeds a predetermined value, the poppet 448 is displaced relative to the diaphragm seal 445 as atmospheric pressure pressing on the side of the poppet 448 communicating with port 414 overcomes the opposite (and now lower) force of resilient member 452 pressing on the side of poppet 448 communicating with port 486. As a result of the displacement, poppet 448 and the diaphragm seal 445 are no longer in contact and the system will draw air from the atmosphere through port 414, past the diaphragm seal 445 and poppet 448, and into the EVAP system through port 486. Air will be drawn into the EVAP system until the excessive vacuum condition is relieved and the vacuum level is again within an acceptable system range. At that point, the poppet 448 and the diaphragm seal 445 again come into contact and the EVAP system is sealed. The poppet 448 and the diaphragm seal 445 open when the following condition is met:

$$F_{resilient\ member}(460) \leq F_{poppet@vacuum\_relief\_level}(663)$$

Figure 7:
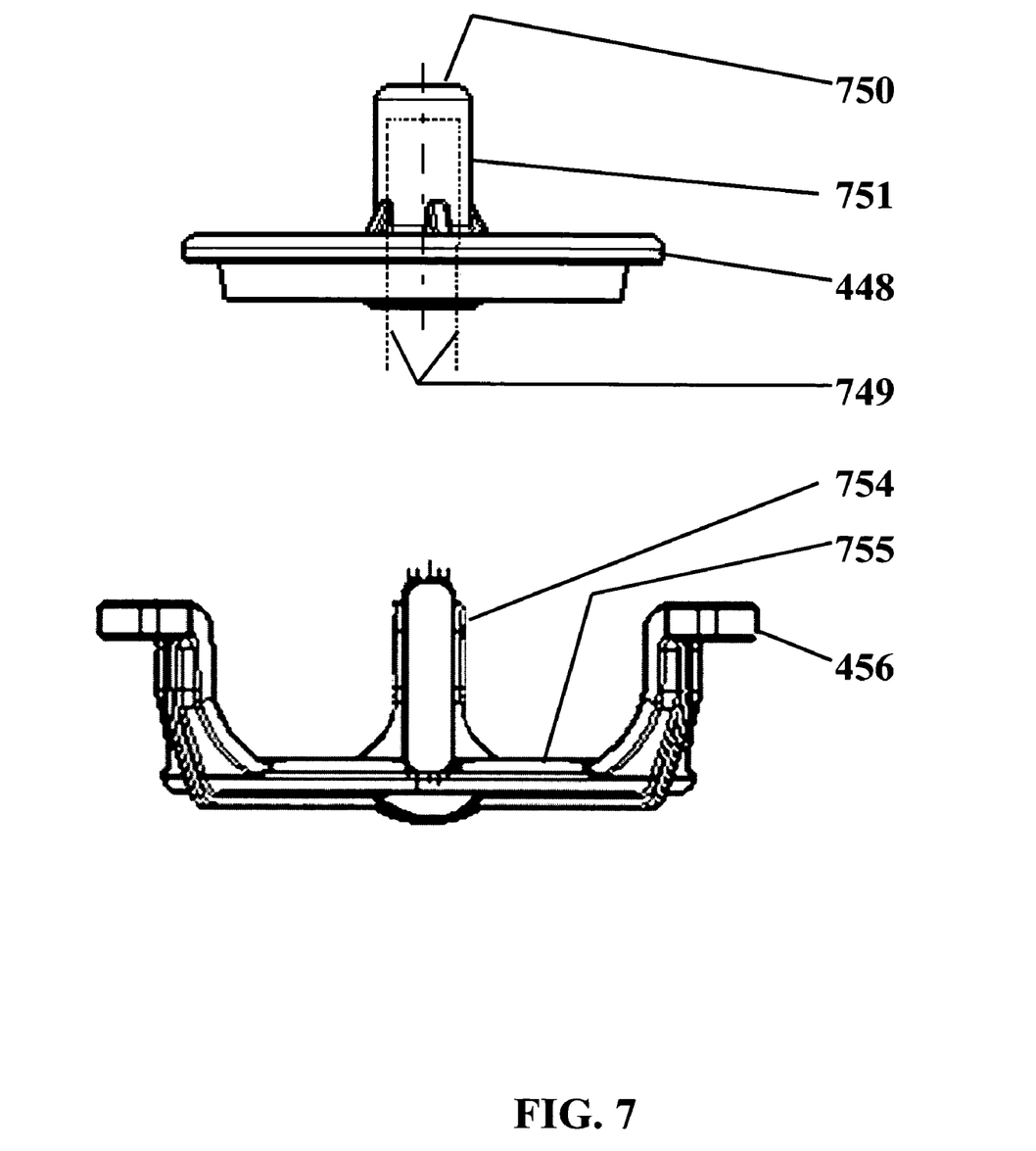
FIG. 7 is a schematic illustration of a poppet and resilient member locator, in accordance with the present invention.

Where: $F_{poppet@vacuum\_relief\_level}(663) = Area_{poppet} \times Vacuum_{relief\_point}$ FIG. 7 is a schematic illustration of a poppet 448 and resilient member locator 456, in accordance with the present invention. The motion of the poppet 448 with respect to the resilient member locator 456 is guided by a sliding contact of an external cylindrical surface of a poppet guide 754 with an internal cylindrical surface 749 of a guide cylinder 751 of the poppet 448. The poppet 448 also has an end surface of the guide cylinder 750 which can contact the pressure relief contact surface of the cover as discussed below with reference to FIG. 8 as part of the pressure relief functionality. The resilient member locating surface 755 of the resilient member locator 456 is in contact with the resilient member (not shown), the resilient member being contained between the resilient member locating surface 755 and the poppet 448.

Figure 8:
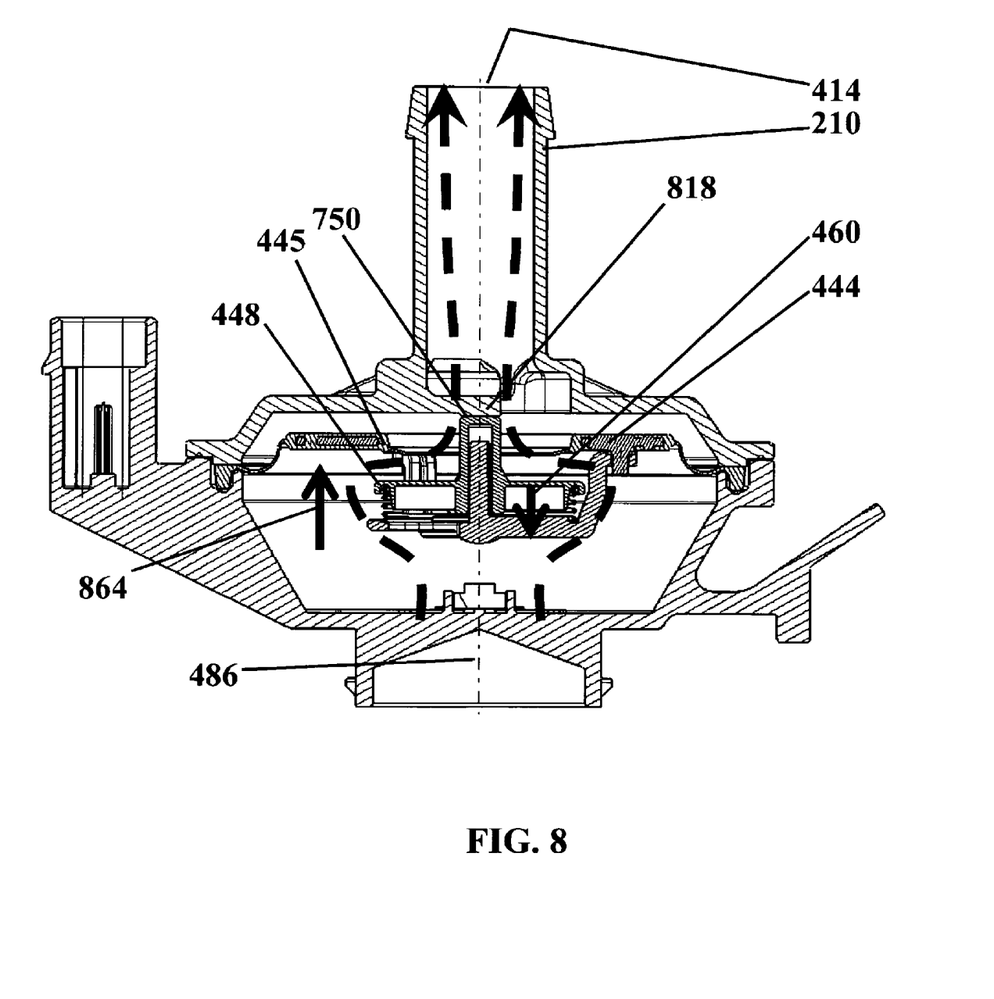
FIG. 8 is a schematic illustration of a diaphragm-seal valve mechanism in the pressure relief function position, in accordance with the present invention.

FIG. 8 is a schematic illustration of a diaphragm-seal valve mechanism 800 in the pressure relief function position, in accordance with the present invention. This function provides a pressure relief to vent or "blow off" any excessive fuel vapor immediately after engine shutdown and to facilitate the desired vacuum generation. Another benefit of the pressure relief function is to allow air to exit the fuel tank at high flow rates, such as at tank refueling. That function is commonly known as Onboard Refueling Vapor Recovery (ORVR). In general the pressure relief function should be at a very low pressure level in order to minimize the backpressure during refueling and to limit the over pressure in a hot system.

When positive pressure in the fuel system causes a pressure differential across the diaphragm, the diaphragm 444 deflects. That deflection results in contact between the end surface of the guide cylinder 750 of the poppet 448 and the pressure relief contact surface 818 of the cover 210. The diaphragm 444 continues to deflect, due to the higher relative pressure inside the EVAP system as compared to the atmospheric pressure, to the point where a force on the end surface of the guide cylinder 750 causes the poppet 448 and the diaphragm seal 445 to break contact. At that point, the system vents vapor from the EVAP system through port 486, past the poppet 448 and diaphragm seal 445 and to the atmosphere through port 414. Vapor will continue to be vented until the excessive pressure condition is relieved and the pressure level is again within an acceptable range. As this point, the poppet 448 and the diaphragm seal 445 again come into contact and the EVAP system sealed. The poppet 448 and the diaphragm seal 445 will open when the following condition is met:

$$F_{resilient\ member}(460) \leq F_{poppet-diaphragm@pressure\_relief\_level}(864)$$

Figure 9:
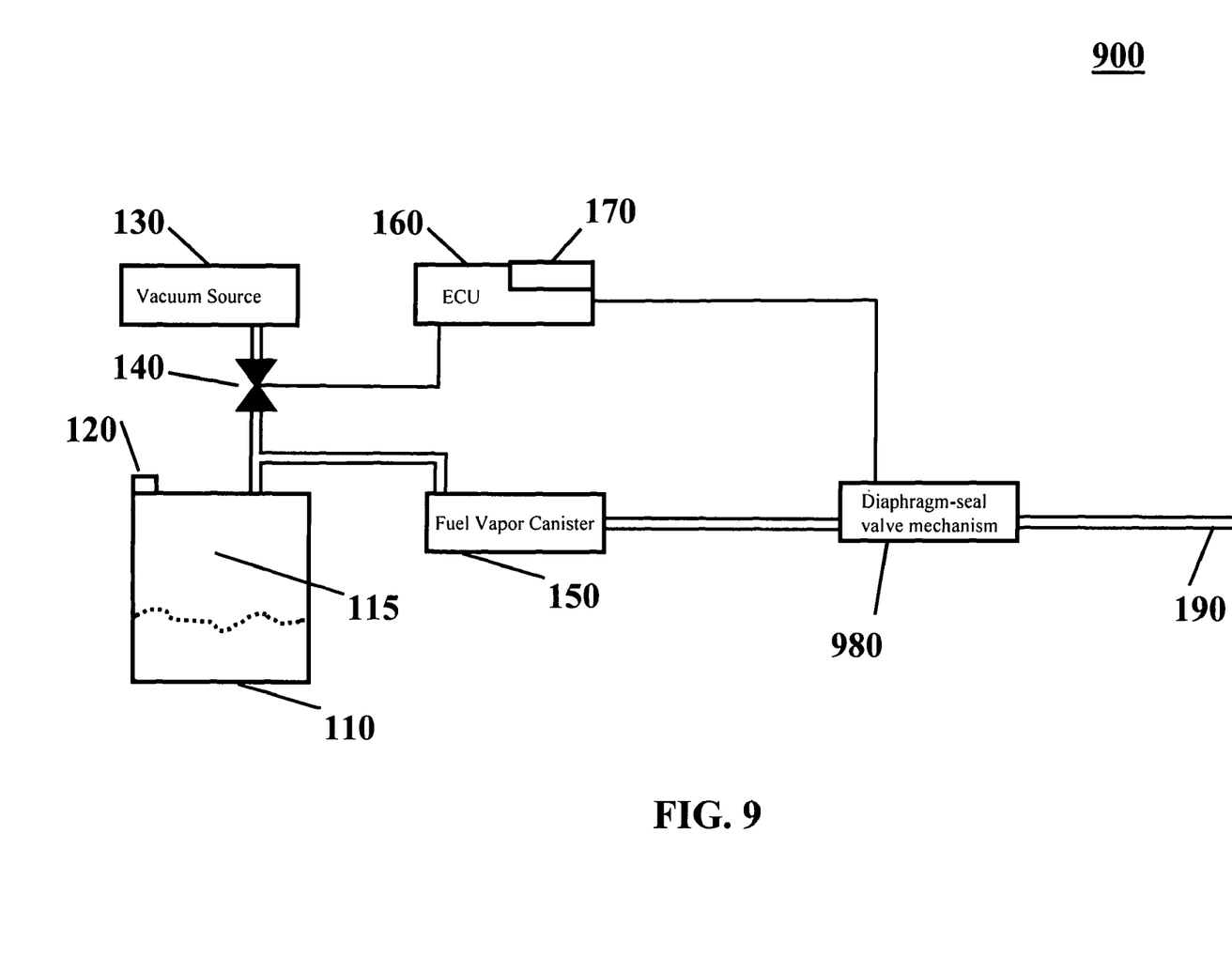
FIG. 9 is a schematic illustration of an exemplary fuel system, including a diaphragm-seal valve mechanism, in accordance with the present invention.

Where: $F_{poppet-diaphragm@pressure\_relief\_level}(864) = Area_{diaphragm-poppet} \times Pressure_{relief\_level}$ FIG. 9 is a schematic illustration 900 of an exemplary fuel system, including the use of a diaphragm-seal valve mechanism, in accordance with the present invention. The system is similar to that shown in FIG. 1, including a fuel tank 110, fuel tank headspace 115, refueling cap 120, vacuum source 130, mixing valve 140, fuel vapor canister 150, ECU 160 with memory storage 170, and port 190. However, the three discrete components of FIG. 1 (vacuum switch 184, vacuum relief 186 and pressure relief 188) are replaced in FIG. 9 with a single diaphragm-seal valve mechanism 980. The diaphragm-seal valve mechanism 980 includes the functionality of the vacuum switch, pressure relief and vacuum relief components it replaces.

Figure 10:
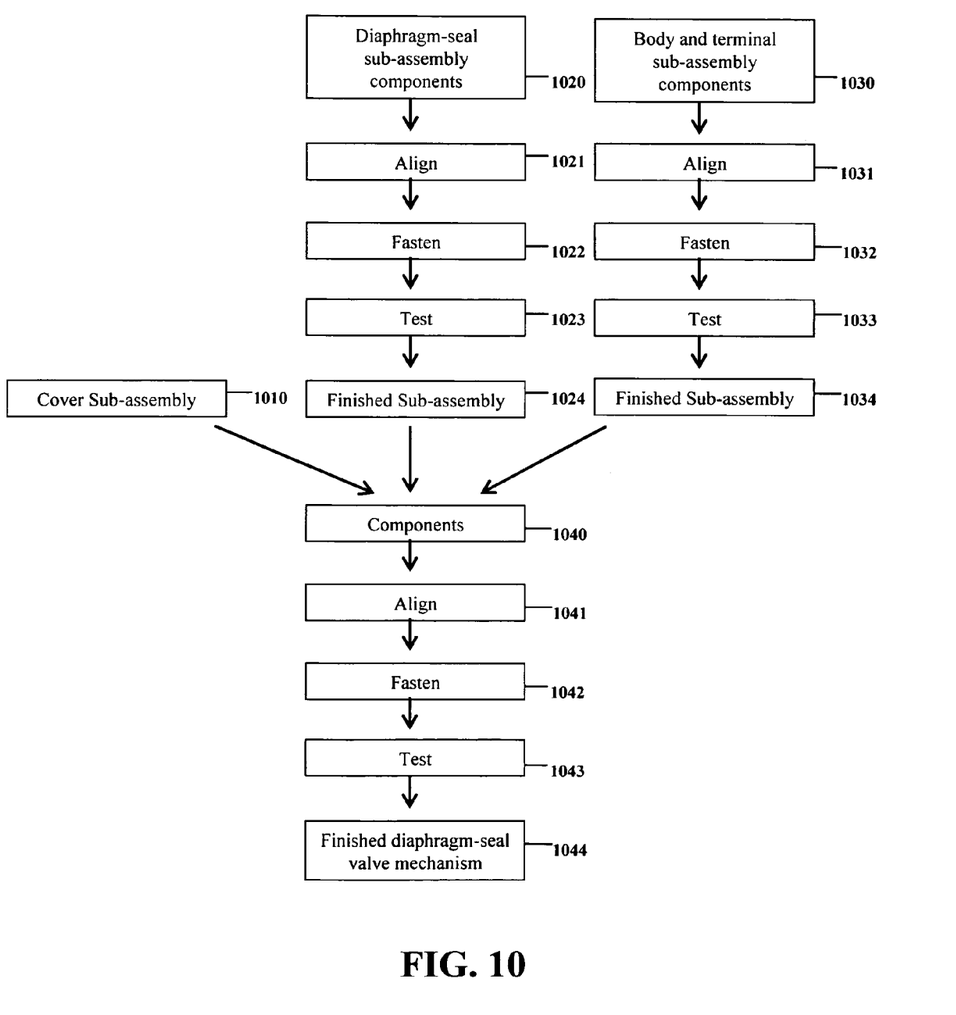
FIG. 10 is a flow chart depicting an assembly method in accordance with the present invention.

FIG. 10 is a flow chart depicting an assembly method in accordance with the present invention. The cover 210 for the diaphragm-seal valve mechanism as shown in FIG. 2 does not need any pre-assembly, but is provided (step 1010) as a component of the final assembly. The diaphragm-seal sub-assembly 240 and the body and terminal subassembly 270, both as shown in FIG. 2, do require assembly prior to the final assembly.

The components comprising the diaphragm-seal sub-assembly 240 are: resilient member locator, resilient member, poppet and the diaphragm (step 1020). The components are aligned in step 1021 in the proper orientation and fastened in step 1022. Method of fastening is not a critical portion to this invention, but is chosen to be appropriate to the materials and the operating environment of the final mechanism. The assembled sub-assembly is now tested (sampling or 100%) in step 1023 prior to being finished in step 1024.

The components comprising the body and terminal subassembly 270 are: switch and, body and terminal, including connector. The components are aligned in step 1031 in the proper orientation and fastened in step 1032. Method of fastening is not a critical portion to this invention. The assembled sub-assembly may now be tested (sampling or 100%) in step 1033 prior to produce the finished sub-assembly in step 1034.

The components comprising the final diaphragm-seal valve mechanism assembly 300 are: 210 (cover), 240 (diaphragm-seal subassembly) and 270 (body and terminal subassembly) as shown in FIG. 2. The components are aligned in step 1041 in the proper orientation, as shown in FIG. 2. Alignment features may be built into various portions of the components to aid in assembly. In step 1042, the cover 210 is secured to the body and terminal subassembly 270. The assembled mechanism may now be tested in step 1043 prior to being finished in step 1044. The finished diaphragm-seal valve mechanism 300 is shown in FIG. 3.

Figure 11:
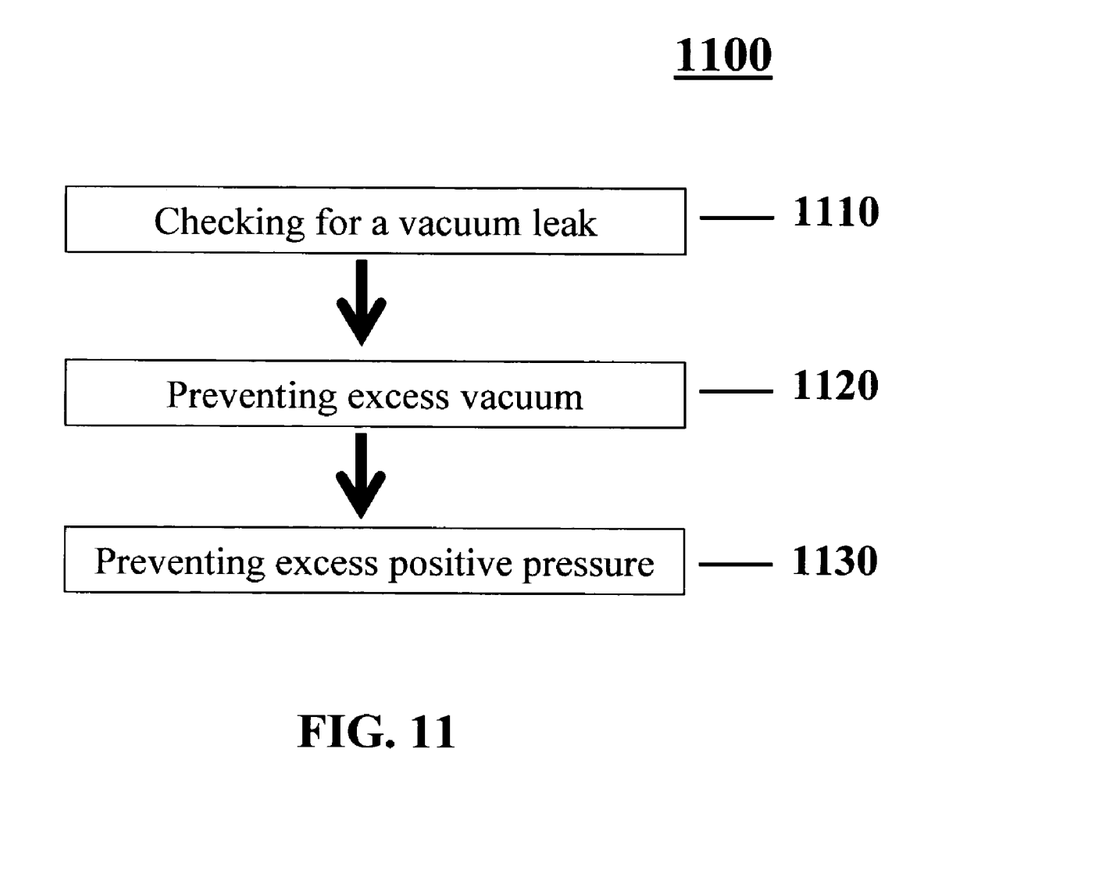
FIG. 11 is a flow chart depicting a method of use in accordance with the present invention.

FIG. 11 is a flow chart depicting a method 1100 of use in accordance with the present invention. This method for controlling pressure in a fuel vapor containment system of an engine fuel system comprises three steps: checking for a vacuum leak (step 1110), preventing excess vacuum (step 1120) and preventing excess positive pressure (step 1130). In step 1110, the vapor containment system of an automotive fuel system checks for a vacuum leak when the engine is off, by monitoring a displacement of a diaphragm having one side subjected to the vacuum pressure of the fuel vapor containment system and the other side subjected to ambient pressure via a port. In step 1120, excess vacuum in the fuel vapor containment system is prevented by flowing air into the fuel vapor containment system through a passageway in the diaphragm when a vacuum level in the fuel vapor containment system exceeds a predetermined relief vacuum level. In step 1130, excess positive pressure in the fuel vapor containment system is prevented by flowing a gas mixture from the fuel vapor containment system through the passageway in the diaphragm when positive pressure in the fuel vapor containment system exceeds a predetermined positive pressure relief level.

The diaphragm-seal valve mechanism described herein has a number of benefits, which the inventor believes could benefit the manufacturer of the device, the integrator of the device and the user of the device. The manufacturer benefits include, lower number of components, lower amount and cost of materials, no calibration and smaller size. The integrator benefits include, those of the manufacturer in addition to ease of integration (i.e. due to fewer components), ease and flexibility of installation/maintenance (i.e. due to smaller size and no calibration requirement), and improved reliability (i.e. due to lower cost/fewer components and a calibration going out of specification). The user benefits include, lower cost and improved reliability. An interesting aspect of this device is that if instead of being used in the described configuration (see FIG. 4 where port 414 is connected to an air filter/vent and port 486 is connected to the EVAP system), the device is installed in reverse (port 486 instead connected to an air filter/vent and port 414 connected to the EVAP system), the mechanism of the invention could be used to detect pressure level in the EVAP system.

The foregoing detailed description is to be understood as being in every respect illustrative and exemplary, but not restrictive, and the scope of the invention disclosed herein is not to be determined from the description of the invention, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention.

I claim:

1. A fuel vapor management system, comprising:
 a housing having a first chamber communicating with a fuel evaporative system, a second chamber communicating with a vent;
 a divider separating the two chambers, the divider including:
  a flexible diaphragm extending from the housing, the diaphragm being alternatively displaceable toward the first chamber and toward the second chamber by pressure differentials between the chambers; and
  a poppet assembly mounted to the flexible diaphragm for displacement therewith, the poppet assembly defining a normally closed passageway communicating between the first and second chambers through the diaphragm, the passageway being openable by a predetermined vacuum relief pressure differential acting on the poppet assembly whereby a pressure of the second chamber exceeds a pressure of the first chamber;
 a vacuum sensing switch mounted to the housing and positioned for actuation by the divider upon displacement of the flexible diaphragm toward the first chamber, the vacuum sensing switch being actuable by a predetermined vacuum sensing pressure differential acting on the divider whereby a pressure of the second chamber exceeds a pressure of the first chamber, the predetermined vacuum sensing pressure differential being less than the predetermined vacuum relief pressure differential; and
 a pressure relief contact surface of the housing positioned for contacting the poppet assembly upon displacement of the flexible diaphragm toward the second chamber, the passageway further being openable by a force of the contact surface on the poppet assembly resulting from a predetermined pressure relief pressure differential acting on the divider whereby a pressure of the first chamber exceeds a pressure of the second chamber.

2. The fuel vapor management system of claim 1, wherein the vacuum sensing switch is actuated by contact with the poppet assembly.

3. The fuel vapor management system of claim 1, wherein the poppet assembly further comprises:
 a sealing surface;
 a poppet is mounted for movement between a closed position wherein the poppet is in contact with the sealing surface and closing the passageway, and an open position wherein the poppet is displaced from the sealing surface, permitting flow through the passageway; and
 a resilient member biasing the poppet toward the sealing surface.

4. The fuel vapor management system of claim 3, wherein the poppet assembly further comprises a resilient member locator including:
 at least one diaphragm mounting structure for mounting the poppet assembly to the diaphragm;
 a poppet guide in sliding contact with the poppet for guiding the poppet between the closed and open positions; and
 a resilient member locating surface in contact with the resilient member, the resilient member being contained between the resilient member locating surface and the poppet.

5. The fuel vapor management system of claim 4, wherein:
 the poppet guide of the resilient member locator further comprises a post extending from , the resilient member locating surface toward the second chamber; and
 the poppet further comprises a guide cylinder having an inner cylindrical wall in sliding contact with the post for guiding the poppet.

6. The fuel vapor management system of claim 5, wherein:
 the poppet further comprises an end surface of the guide cylinder, the end surface contacting the pressure relief contact surface of the housing upon displacement of the flexible diaphragm toward the second chamber.

7. The fuel vapor management system of claim 4, wherein the vacuum sensing switch is actuated by contact with the resilient member locator.

8. The fuel vapor management system of claim 3, wherein the sealing surface and the flexible diaphragm comprise a single integral unit.

9. A method for controlling pressure in a fuel vapor containment system of an engine fuel system, comprising the steps of:
 checking for a vacuum leak in the fuel vapor containment system when the engine is off by monitoring a displacement of a diaphragm having one side subjected to a vacuum pressure of the fuel vapor containment system;
 preventing excess vacuum in the fuel vapor containment system by flowing air into the fuel vapor containment system controlling air flow through a passageway in the diaphragm with a poppet when a vacuum level in the fuel vapor containment system exceeds a predetermined relief vacuum level by subjecting the poppet to the predetermined relief vacuum level such that a force exerted on the poppet by the vacuum overcomes a resilient member force maintaining the poppet in a position closing the passageway; and
 preventing excess positive pressure in the fuel vapor containment system by flowing a gas mixture from the fuel vapor containment system through the passageway in the diaphragm when positive pressure in the fuel vapor containment system exceeds a predetermined positive pressure relief level and displacing the diaphragm in response to excess positive pressure in the fuel vapor containment system, the displacement causing the poppet to contact a pressure relief contact surface to open the passageway, whereby a force exerted on the poppet by the pressure relief contact surface overcomes a resilient member force maintaining the poppet in a closed position.

10. The method of claim 9, wherein the step of checking for a vacuum leak in the fuel vapor containment system when the engine is off further comprises monitoring a switch that is actuated by subjecting the first side of the diaphragm to a predetermined leak diagnostic vacuum level that is lower than the predetermined relief vacuum level.

11. A system for controlling pressure in a fuel vapor containment system of an engine fuel system, comprising:
 a displaceable diaphragm having one side subjected to a pressure of the fuel vapor containment system;
 a sensor for monitoring displacement of the diaphragm;
 a pressure relief valve mounted on the displaceable diaphragm and configured for allowing flow through the diaphragm into the fuel vapor containment system when a vacuum level in the fuel vapor containment system exceeds a predetermined relief vacuum level, and further configured for allowing flow through the diaphragm out of the fuel vapor containment system when a positive pressure level in the fuel vapor containment system exceeds a predetermined positive pressure relief level, wherein the pressure relieve valve includes a poppet mounted on the diaphragm for movement between a closed position wherein the poppet prevents flow through the diaphragm and an open position permitting flow through the passageway wherein the poppet includes a sealing surface and a resilient member biasing the poppet toward the sealing surface, wherein the poppet is in contact with the sealing surface for closing the passageway through the diaphragm, and when in an open position the poppet is displaced from the sealing surface for permitting flow through the passageway.

12. The system of claim 11, wherein a surface of the poppet is subject to the vacuum in the fuel vapor containment system, resulting in a force on the poppet that overcomes the resilient member and displaces the poppet from the sealing surface.

13. The system of claim 11, further comprising a pressure relief contact surface facing a surface of the poppet, wherein excess positive pressure in the fuel vapor containment system causes a displacement of the diaphragm and a contacting of the pressure relief contact surface and the surface of the poppet, resulting in a force on the poppet that overcomes the resilient member and displaces the poppet from the sealing surface.

14. The system of claim 11, wherein the pressure relief valve further comprises a resilient member locator including:
at least one diaphragm mounting structure for mounting the pressure relief valve to the diaphragm;
a poppet guide in sliding contact with the poppet for guiding the poppet between the closed and open positions; and
a resilient member locating surface in contact with the resilient member, the resilient member being contained between the resilient member locating surface and the poppet.

15. The system of claim 14, wherein:
the poppet guide of the resilient member locator further comprises a post extending from the resilient member locating surface; and
the poppet further comprises a guide cylinder having an inner cylindrical wall in sliding contact with the post for guiding the poppet.

16. The system of claim 11, wherein the sealing surface and the flexible diaphragm comprise a single integral unit.

17. The system of claim 11, wherein the sensor is a switch actuated by contact with an element mounted for movement with the displaceable diaphragm.

18. The system of claim 11, wherein the switch is actuated by a displacement of the diaphragm resulting from a vacuum level in the fuel vapor containment system less than the predetermined relief vacuum level.

* * * * *